United States Patent Office 3,076,030
Patented Jan. 29, 1963

3,076,030
PROCESS FOR THE PREPARATION OF
ACETYLAMINOPHENOLS
Morris Freifelder, Waukegan, Ill., assignor to Abbott
Laboratories, North Chicago, Ill., a corporation of Illinois
No Drawing. Filed Nov. 3, 1960, Ser. No. 66,909
6 Claims. (Cl. 260—562)

This application relates to the preparation of acetylaminophenols. More particularly, it refers to the simultaneous catalytic reduction and acetylation of nitrophenols to N-acetylaminophenols.

Aromatic nitro compounds may be reduced by three different methods: electrolytic, chemical or catalytic. Of the chemical methods of reduction, those using metal and acid usually require excessive amounts of elemental metal in order to produce enough hydrogen for successful reduction. In the procedure of Morse [Berichte, 11, page 232 (1878)] the chemical method using tin and acetic acid on p-nitrophenol is reported to give p-acetylaminophenol directly. In this procedure a number of disadvantages are evident: tin salts form a complex with aromatic amines; removal of the tin is a laborious process; incomplete removal of tin salt results in contamination of acetylaminophenol making it unsuitable for pharmaceutical use. In addition the excessive amount of metal necessary to carry out a chemical reduction with tin and a weak acid such as acetic acid makes a process such as described by Morse uneconomical. Furthermore, in such a system, heat is required for the evolution of hydrogen for the reduction.

It is therefore an object of the present invention to provide a simpler and more elegant process for the production of acetylaminophenol. Another object is to produce acetylaminophenol in high yield by a catalytic reduction. A further object of the present invention is the production of high quality acetylaminophenol. Other objectives will be apparent from the following disclosure and the appended claims.

According to the present invention, nitrophenol is reduced with gaseous hydrogen in the presence of a palladium catalyst and at least one equivalent of acetic anhydride to produce acetylaminophenol. Surprisingly, this reduction can be carried out at room temperature and low pressures, but higher pressures and/or temperatures may of course be used. The reaction produces a yield of 75–100% of acetylaminophenol of excellent quality, purity, color and appearance. In addition, this simultaneous reduction and acetylation is fast and extremely economical since the palladium catalyst employed in this process is reusable.

The process of the present invention is preferably carried out at room temperature, but temperatures between about 10° and 60° C. are permissible. The process may be carried out at a hydrogen pressure between slightly above atmospheric pressure to several hundred atmospheres, but no advantage is seen in using pressures higher than about three atmospheres, thus permitting the use of so-called low-pressure equipment. The amount of catalyst, calculated as actual metal in units of the starting material nitrophenol, is between 0.05% and 0.5%. Excellent results are obtained by using finely divided palladium metal, palladium on charcoal, silica gel, alumina, kieselguhr, chromium oxide, zirconium oxide, bentonite, asbestos, etc. with a palladium content of 1 to 50%. The catalyst itself may be in the form of pellets, granules, powder, etc. and the metal may be precipitated on the carrier in the form of the metal or a compound thereof which reduces in situ in the presence of hydrogen.

The reactions of the present invention may be carried out in an inert medium or diluent, although no advantage is seen in increasing the volume of the reaction mixture above that required. As inert media, solvents such as ethyl acetate, thiophene-free benzol, or other hydrocarbons may be used. The term "inert" is meant to express that the diluent is not reacting with the starting material, the end product of the reaction, the intermediary aminophenol, the catalyst, or the acetic anhydride used in the reaction. Most conveniently, acetic acid is used as a diluent since it does not add any undesirable ingredients to the reaction mixture. The amount of acetic anhydride to take part in the reaction is chosen between one equivalent and any desirable excess thereover, but no advantage is seen in using a large excess of acetic anhydride. Excellent results are obtained by using 1 to 1.2 equivalents of acetic anhydride per equivalent of nitrophenol.

The method of the present invention can easily be adapted to a continuous process in which hydrogen, nitrophenol, inert solvent if used, and acetic anhydride are conducted concurrently or countercurrently over a bed of palladium catalyst.

The process of the present invention is better understood by referring to the following examples. These examples are meant as illustrations only and can be modified in many ways as suggested by the above general disclosures.

EXAMPLE 1

*p-Acetylaminophenol*

(*a*) A solution of 13.9 g. (0.1 mole) of p-nitrophenol and 50 cc. of glacial acetic acid containing 10.2 g. (0.1 mole) of acetic anhydride is mixed with 1 g. of a catalyst consisting of 5% palladium on carbon. The reaction mixture is reduced in a Parr shaker, having a shaking speed of 270 r.p.m., under a hydrogen pressure of 35 p.s.i. After 30 minutes, the calculated amount of hydrogen is taken up and the slurry is filtered. The filtrate is concentrated under reduced pressure to a volume of 15 cc. Upon cooling, p-acetylaminophenol crystallizes from the solution. The crystals are filtered off and treated with anhydrous ether, filtered again, and washed with ether. After drying, a yield of 12 g. of p-acetylaminophenol, corresponding to 79.5% of theory, is obtained. The product melts at 169–71° C.

(*b*) In a modification of the above example, the same amount of p-nitrophenol is reduced under similar conditions but in the presence of 0.25 g. of a catalyst consisting of 5% palladium on carbon, representing a total amount of 0.09% of metal based on the amount of nitrophenol. After completion of the reduction, the solution is filtered and the catalyst is washed with 10 cc. of glacial acetic acid. The solution is then concentrated to a thick paste and treated with 80 cc. of water. The aqueous slurry is cooled in an ice bath and filtered to yield 11.0 g. of p-acetylaminophenol, melting at 169–71° C. By neutralizing the filtrate with sodium bicarbonate, an additional 2.5 g. of p-acetylaminophenol is obtained, which together with the initial crop represents a yield of 89.4% of theory. After combining both crops and recrystallizing them from water, the melting point is 170–1° C. The crystalline substance is white and odorless. Analysis: 63.35% C; 5.70% H; 9.06% N (calculated for $C_8H_9NO_2$: 63.54% C; 5.99% H; 9.26% N).

In a second run, the catalyst is reused producing a yield of 79.5% of p-acetylaminophenol.

(*c*) When platinum oxide is used as catalyst for this reaction in accordance with the procedure described by Burckhalter in J.A.C.S., volume 70, page 1371 (1948), a yield of only 56% of p-acetylaminophenol is obtained, although a four-fold amount of noble metal is used as catalyst. Even after several recrystallizations, the product cannot be obtained in pure, white form suitable for pharmaceutical preparations.

EXAMPLE 2 o-Acetylaminophenol 13.9 g. of o-nitrophenol is reduced in the presence of 50 cc. of glacial acetic acid, 10.2 g. of acetic anhydride and 0.5 g. of a catalyst containing 5% palladium on carbon. After hydrogenating the mixture for 30 minutes at a pressure of 36 p.s.i., 500 cc. of water are added to the mass. The suspension is heated to boiling, treated with 0.5 g. of a decolorizing carbon and filtered through a heated funnel. After cooling, the crystals are filtered off, and dried. An 82.5% yield of o-acetylaminophenol is obtained, melting at 208–9° C. Without recrystallization it shows an analysis of 63.38% C; 6.12% H; and 9.25% N (calculated for $C_8H_9O_2N$: 63.54% C; 5.99% H; and 9.26% N), indicating the outstanding quality of o-acetylaminophenol prepared in this one-step reaction.

EXAMPLE 3 m-Acetylaminophenol

The procedure of Example 1(a) is repeated with m-nitrophenol as starting material. The hydrogenation is completed in 35 minutes, after which the solution is filtered from the catalyst and concentrated under reduced pressure. The syrupy mass is treated with 100 cc. of cold water and the mixture cooled in an ice bath until precipitation is completed. The crystals are filtered, the filter cake washed with water, and dried. The m-acetylaminophenol obtained in this manner represents 75% of the theoretical yield and melts at 151–151.5° C. Without recrystallization, these crystals give analytical values of 63.40% C; 6.21% H; and 9.32% N, compared with the calculated values for $C_8H_9O_2N$ (63.54% C; 5.99% H; and 9.26% N).

The method of the present invention is particularly advantageous when compared to other hydrogenation procedures for nitrophenol. A very low catalyst ratio of 0.05–0.5% palladium metal is used, comparing with older methods of using 1.5% platinum oxide or a large percentage of ignitable Raney nickel; low pressure equipment such as a still, a Parr shaker or similar containers can be used; high yields are obtained; the separation of the desired acetylaminophenol is extremely simple; and the crude crystalline acetylaminophenol is of analytically pure quality, suitable for end uses in pharmaceutical preparations.

Others may practice the invention in any of the numerous ways which will be suggested to one skilled in the art by the present disclosure. All such practice of the invention is considered to be a part hereof provided it falls within the scope of the appended claims.

I claim:

1. In the process of manufacturing acetylaminophenol the step comprising reducing nitrophenol with gaseous hydrogen in the presence of from 0.05% to 0.5% by weight of palladium said amount being based on the amount of said nitrophenol and at least one mole equivalent of acetic anhydride.

2. The process of claim 1 wherein the reduction is carried out at room temperature.

3. The process of claim 1 wherein the reduction is carried out at a hydrogen pressure of from slightly above atmospheric pressure to a pressure of about 100 p.s.i.

4. The process of claim 1 wherein said palladium is supported by a carrier.

5. The process of claim 4 wherein said carrier is charcoal.

6. The process of claim 1 wherein said nitrophenol is p-nitrophenol.

References Cited in the file of this patent

UNITED STATES PATENTS

| | | |
|---|---|---|
| 2,816,926 | Smiley | Dec. 17, 1957 |
| 2,867,628 | Cass | Jan. 6, 1959 |
| 2,967,866 | Hodge | Jan. 10, 1961 |

OTHER REFERENCES

Burckhalter et al.: "Journal of the American Chemical Society," volume 70, pages 1363–73, pages 1364, 1366, 1371 relied on (1948).

Dunworth et al.: "Journal of the American Chemical Society," volume 74, pages 1459–62 (1952).